US009369360B1

(12) United States Patent
Segalov et al.

(10) Patent No.: US 9,369,360 B1
(45) Date of Patent: Jun. 14, 2016

(54) SYSTEMS AND METHODS FOR FAULT DETECTION IN LARGE SCALE NETWORKS

(71) Applicant: Google Inc., Mountain View, CA (US)

(72) Inventors: Michal Segalov, Haifa (IL); Eyal Soha, Tel-Aviv (IL); Dan Raz, Timrat (IL); Ido Feldman, Hod Hasharon (IL); Dotan Emanuel, Herzeliya (IL); Avinatan Hassidim, Petah Tikva (IL)

(73) Assignee: Google Inc., Mountain View, CA (US)

( * ) Notice: Subject to any disclaimer, the term of this patent is extended or adjusted under 35 U.S.C. 154(b) by 114 days.

(21) Appl. No.: 14/275,230

(22) Filed: May 12, 2014

(51) Int. Cl.
*H04L 12/26* (2006.01)

(52) U.S. Cl.
CPC .................................. *H04L 43/0847* (2013.01)

(58) Field of Classification Search
CPC . H04L 12/26; H04L 12/2623; H04L 12/2644; H04L 12/2678
USPC .................................. 370/241, 242, 248, 249
See application file for complete search history.

(56) References Cited

U.S. PATENT DOCUMENTS

| 6,269,330 | B1 | 7/2001 | Cidon et al. |
| 7,120,819 | B1 * | 10/2006 | Gurer ................. G06F 11/2294 709/223 |
| 7,899,048 | B1 | 3/2011 | Walker et al. |
| 7,933,214 | B2 * | 4/2011 | Stjernholm ............. H04L 43/10 370/248 |
| 7,983,175 | B2 * | 7/2011 | Gale .................... H04L 12/2697 370/242 |
| 8,072,890 | B2 * | 12/2011 | Meloche ............. H04L 12/2697 370/242 |
| 8,339,987 | B2 * | 12/2012 | Tanaka ................ H04L 12/4645 370/229 |
| 8,370,466 | B2 * | 2/2013 | Verma ................. H04L 41/0631 709/221 |
| 8,837,302 | B2 | 9/2014 | Basile et al. |
| 8,902,733 | B2 * | 12/2014 | Enomoto ............ H04L 43/0811 370/224 |
| 2009/0180393 | A1 * | 7/2009 | Nakamura .............. H04L 41/12 370/252 |
| 2011/0125921 | A1 | 5/2011 | Karenos et al. |
| 2012/0269073 | A1 | 10/2012 | Xu et al. |
| 2015/0249587 | A1 * | 9/2015 | Kozat ..................... H04L 43/10 370/222 |

* cited by examiner

*Primary Examiner* — Dmitry H Levitan
(74) *Attorney, Agent, or Firm* — Edward A. Gordon; Foley & Lardner LLP

(57) ABSTRACT

Systems and methods for fault detection in large scale networks are provided. Probing instructions are generated by a probing controller associated with a network having a plurality of nodes. The probing instructions include a specified source node and a specified destination node. Each probing instruction is transmitted to a probing agent coupled to the specified source node and a data packet is transmitted from the probing agent to the specified destination node. A fault detection module is informed of probing instructions associated with failed transmissions, identifies a plurality of nodes having a likelihood of being in a network path associated with failed transmissions, and processes the plurality of nodes having a likelihood of being in the network paths associated with failed transmissions to identify of a set of likely failed nodes.

23 Claims, 8 Drawing Sheets

SYSTEMS AND METHODS FOR FAULT DETECTION IN LARGE SCALE NETWORKS

FIELD OF THE INVENTION

The present disclosure relates generally to network fault detection, and, more particularly, to identifying faulty elements causing silent failures in large scale networks.

BACKGROUND

Computer networks may include any number of routers and other devices that direct the transmission of data from one location to another. Transmission of data from one location to another involves routing the information across multiple interconnected devices in the network. A fault it in a device in the network can thus have an impact on many paths that data traverses in the network and can result in failure of the transmissions. Certain faults that result in loss of data during such transmissions are referred to as silent failures (or black holes). The faults causing silent failures are challenging to identify, especially in large scale networks. Because silent failures are unannounced and can only be identified by their effects on data transmission, active monitoring and identification of such faults is needed.

SUMMARY

One aspect of the disclosure is directed to a system for fault detection in large scale networks. The system includes a plurality of probing controllers associated with a network having a plurality of nodes. Each probing controller generates a plurality of probing instructions. Each probing instruction includes a source node and a destination node in the network. Probing controllers forward each of the plurality of probing instructions to the source nodes included in the respective probing instructions, receive data from each of respective source nodes indicative of the source nodes' success in transmitting a data packet to its respective destination node, and in response to receiving data indicating a failure of a source node to transmit a data packet to its respective destination node, inform a fault detection module of the probing instruction associated with the failed transmission. The fault detection module is configured to receive identification of a plurality of probing instructions associated with failed transmissions from the probing controller. For each of the probing instructions received, the fault detection module identifies a plurality of nodes having a likelihood of being in a network path associated with the failed transmission and processes the identified plurality of nodes having a likelihood of being in a network path associated with the failed transmission to identify a set of likely failed nodes.

Another aspect of the disclosure is directed to a method for fault detection in large scale networks. The method includes generating a plurality of probing instructions by a probing controller associated with a network having a plurality of nodes. The probing instructions include a specified source node and a specified destination node for each probing instruction. Each probing instruction is transmitted to a probing agent coupled to the specified source node and a data packet is transmitted from the probing agent to the specified destination node. A fault detection module is informed of probing instructions associated with failed transmissions, identifies a plurality of nodes having a likelihood of being in a network path associated with failed transmissions, and processes the plurality of nodes having a likelihood of being in the network paths associated with failed transmissions to identify of a set of likely failed nodes.

Another aspect of the disclosure is directed to a computer readable media storing processor executable instructions which when carried out by one or more processors, cause the processors to generate a plurality of probing instructions by a probing controller associated with a network having a plurality of nodes. The probing instructions include a specified source node and a specified destination node. For each probing instruction, the instructions, when carried out, further cause the one or more processors to transmit the probing instruction to a probing agent coupled to the specified source node, transmit a data packet from the probing agent to the specified destination node. The instructions stored on the computer readable media, when carried out, further cause the one or more processors to inform a fault detection module of probing instructions associated with failed transmissions, identify portions of network paths associated with failed transmissions, and process the network paths associated with failed transmissions to identify of a set of likely failed nodes.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Following below are descriptions of various concepts related to, and implementations of, methods, apparatuses, and systems for detecting faults causing silent failures in a computer network. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
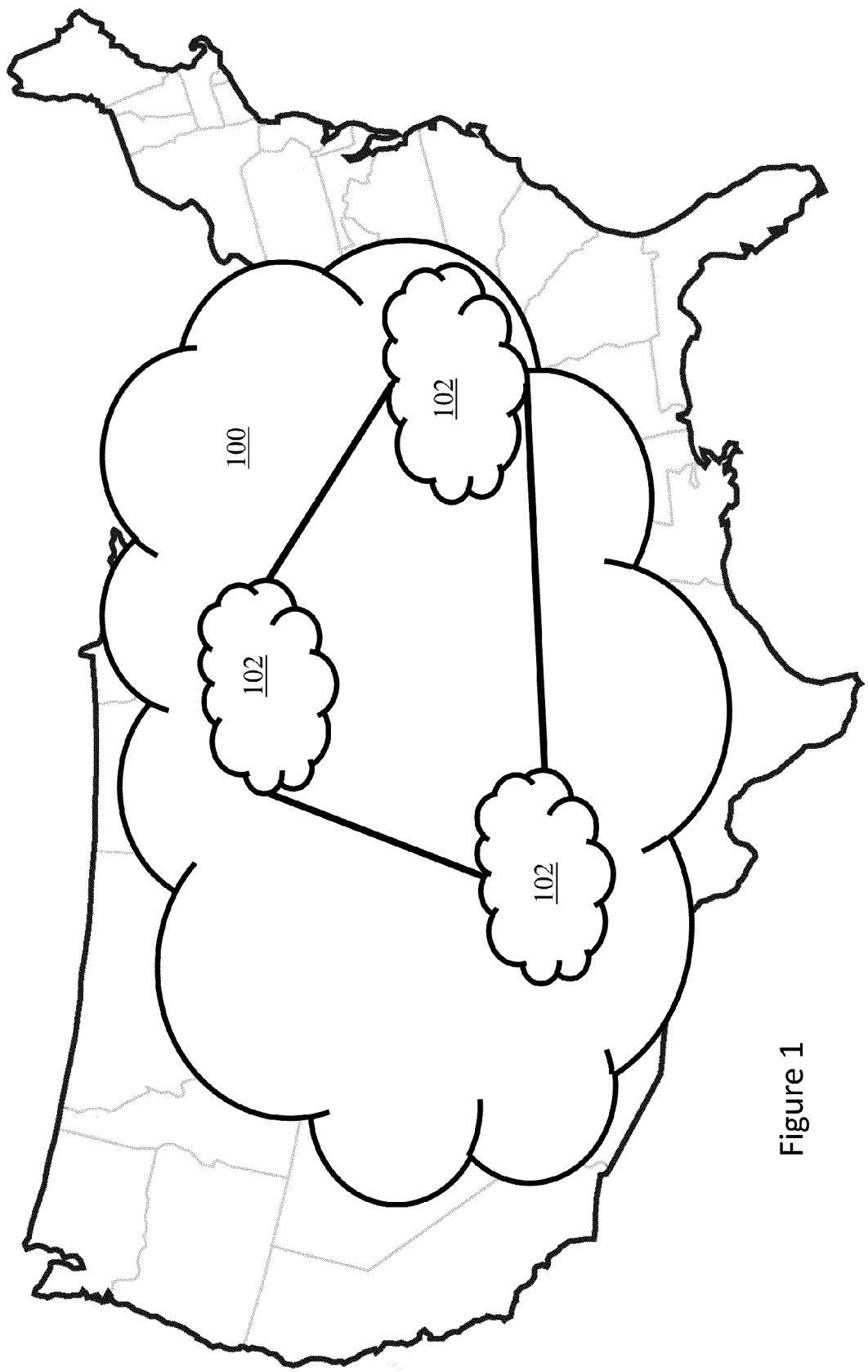
FIG. 1 is a schematic diagram of an example network, according to an illustrative implementation.
Figure 2:
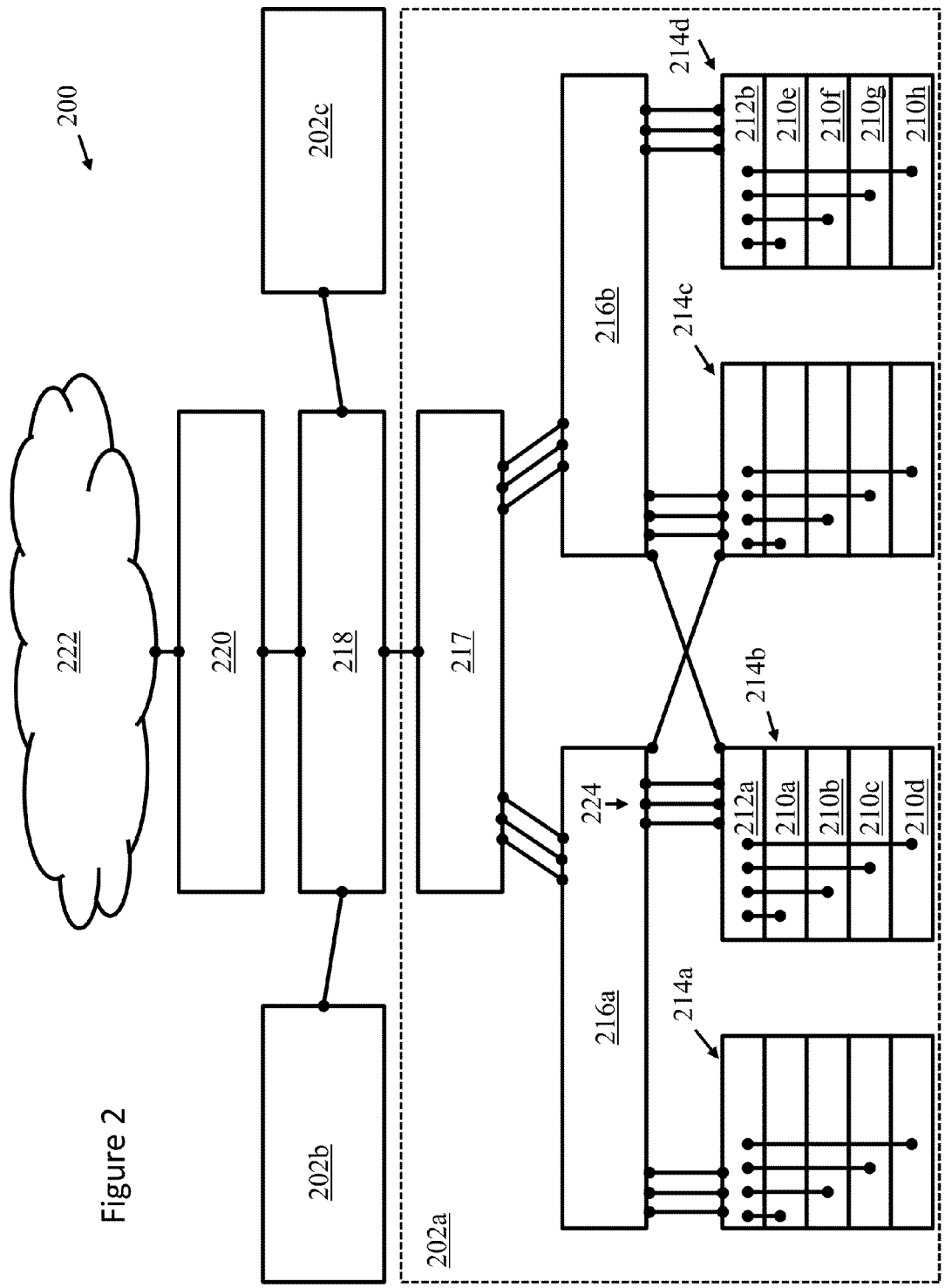
FIG. 2 is a block diagram of an example data center network, according to an illustrative implementation.

The present disclosure is directed generally to systems and methods of detecting and identifying silent failures in a network. The network includes a plurality of servers, switches, routers or other hardware components that are collectively referred to as "nodes" herein. Nodes can be faulty for any of a number of reasons, including having a faulty link, faulty configuration or faulty hardware. Nodes can be faulty only at one or more of many ports on the node. Nodes may also be faulty in specific situations. For example, silent failures can result from a node that is faulty in that it fails to receive or transmit a certain type of data packet or fails to receive or transmit a data packet in the context of a certain path. Nodes are not always faulty for all data packets that pass through them. A "faulty node" or "failed node" may also result from a software or configuration error, for example, a routing error or routing that leads to packet loss, where there is no element that is physically faulty. Detection of silent failures can be a major challenge as silent failures are not announced and may only be observed by active monitoring of the network. In large scale networks that include many thousands, in some cases greater than one million nodes, active monitoring can be highly demanding with regard to resources and time. A scalable fault detection system suitable for large scale networks that identifies likely faults is described herein. FIGS. 1 and 2 generally demonstrate the structure and scale associated with some large scale data networks.

FIG. 1 is a block diagram of a network 100 that includes multiple data centers 102. Each data center houses many thousands of servers connected to the network through various switches and gateway devices, described in greater detail below. Data centers may be located in different geographic areas and linked together. In some implementations data centers in the same network may be in different countries, or even different continents. Together, across the data centers, the servers, routers, switches and links between such components form a network that may include tens or hundreds of thousands, in some cases over a million nodes.

FIG. 2 is a block diagram of an example data center 200 which may be included in the network 100 shown in FIG. 1. In broad overview, a data center 200 includes several interconnected superblocks 202a-202c (also referred to as "pods"). Each superblock 202 may include many hundred, and in some implementations over one thousand, servers 210 arranged in racks 214. The superblocks 202 are communicatively coupled to one another by optical and/or electrical communication links. The superblocks 202 can be connected directly, or through spineblocks 218, which serve as switches for routing data communications between the superblocks 202. The server racks 214 and servers 210 are connected to one another via a hierarchy of switches. For example, each server rack 214 includes a top-of-rack ("ToR") switch 212 for handling data communications into and out of a given server rack 214. ToR switches 212 may be connected to one or more aggregating switches 216 within a superblock. While, for illustrative purposes, the superblock 202 in the example data center 200 only depicts three layers of switches (i.e., the top-of-rack switches 212, the aggregating switches 216a and 216b and a top-tier aggregating switch 217) in the hierarchy of switches, in some implementations, a data center may include one or more additional layers of switches in its switching hierarchy. Additional layers of switches may be between the top-of-rack switches 214 and the top-tier aggregating switch 217 in a given superblock 202.

Each server rack 214 groups together, and houses, a plurality of servers 210. Each rack 214 also houses at least one ToR switch 212. Although illustrated as a single group of servers 210 per server rack 214, in practice, a server rack 214 may house multiple groups of servers 210 and a ToR switch 212 for each group.

A ToR switch 212 is an edge layer device connecting a group of servers 210 in a rack 214 to the rest of the data center 200 and to an external data network 222. Each server 210 in a rack 214 has one or more data links to its respective ToR switch 212 via one or more ports on the ToR switch 212. Each ToR switch 212 connects its respective group of servers 210 to at least one aggregating switch 216 by one or more data links to one or more ports 224 on the aggregating switch 216. For example, rack 214b houses a group of servers 210a-210d which each have one or more links to a ToR switch 212a, and the ToR switch 212a is connected to an aggregating switch 216a by one or more links. In some implementations, a ToR switch 212 is connected to multiple aggregation layer devices 216. As an example, ToR switch 212a is connected to aggregating switch 216a as well as aggregating switch 216b.

The servers 210 housed by a data center 200 are accessed externally via an external data network 222. The external data network 222 is a network facilitating interactions between computing devices. An illustrative example external data network 222 is the Internet; however, other networks may be used. The external data network 222 may be composed of multiple connected sub-networks. The external data network 222 can be a local-area network (LAN), such as a company intranet, a metropolitan area network (MAN), a wide area network (WAN), an inter-network such as the Internet, or a peer-to-peer network, e.g., an ad hoc WiFi peer-to-peer network. The external data network 222 may be any type and/or form of data network and/or communication network. The external data network 222 may be public, private, or a combination of public and private networks. The external data network 222 is used to convey information between external computing devices and the servers 210 within the data center 200.

As indicated above, one or more gateway devices 220 connect the servers 210 to the external data network 222 through the described architecture culminating in the gateway devices 220. A gateway device 220 is a high bandwidth high capacity network device such as a router or a switch. In some implementations, a gateway device 220 connects to a corporate backbone or fiber, such that both sides of the gateway device 220 are under unified control. In some implementations, a gateway device 220 connects to a network service provider network, which may be provided by a third party. In some implementations, the gateway device 220 implements a firewall or filtering protocols to restrict data access to or from the data center 200.

The servers 210 in a network may interact with one another by sending and receiving data packets via the network links. The servers 210 may interact with other servers 210 in the same rack 214, on other racks 214 within the same superblock 202, within another superblock 202, or another data center 200 by sending and receiving packets via the network links. A packet may be routed through one or more ToR switches 212, aggregating switches 216, spineblocks 218, and/or network gateway devices 220 to reach its destination server. In many cases, the packets cannot be routed directly from a first superblock 202 to a second superblock 202. Instead, the packets are passed through one or more intermediate superblocks 202 as they are routed from the first superblock 202 to the second superblock 202. In FIG. 2, for example, the server 210a on the server rack 214b may interact with sever 210d, server 210h or a server located within another superblock 202 in the same data 200 center or another data center 200. For example, one possible route to server 210h for a packet being sent by server 210a would be through ToR switch 212a, aggregating switch 216a, top-tier aggregating switch 217, aggregating switch 216b, and ToR switch 212b to server 210h. Because data centers 200 may include multiple superblocks 202 and multiple aggregating layers, routes may include many steps (also referred to as "hops").

There can be multiple paths between any two nodes in a network. For example, a data packet being sent from server 210a to server 210h can travel multiple possible paths. One path for such a data packet is from source node, server 210a, through ToR switch 212a, aggregating switch 216b, ToR switch 212b to destination node, server 210h. Another path for the data packet with the same source and destination nodes is from source node, server 210a, through ToR switch 212a, aggregating switch 216a, aggregating switch 217, aggregating switch 216b, ToR switch 212b and then to the destination node, server 210h. In an example where the top-tier aggregating switch 217 is a faulty node and causing a silent failure, packets sent from source node, server 210a, to the destination node, server 210h via the first above described path from server 210a, through ToR switch 212a, aggregating switch 216b, and ToR switch 212b, will successfully reach the destination node, server 210h. If the packet was routed along the second above described path from the source node, server 210a, through ToR switch 212a, aggregating switch 216a, top-tier aggregating switch 217, aggregating switch 216b, ToR switch 212b and then to server 210h, the packet would fail to reach the destination.

Figure 3:
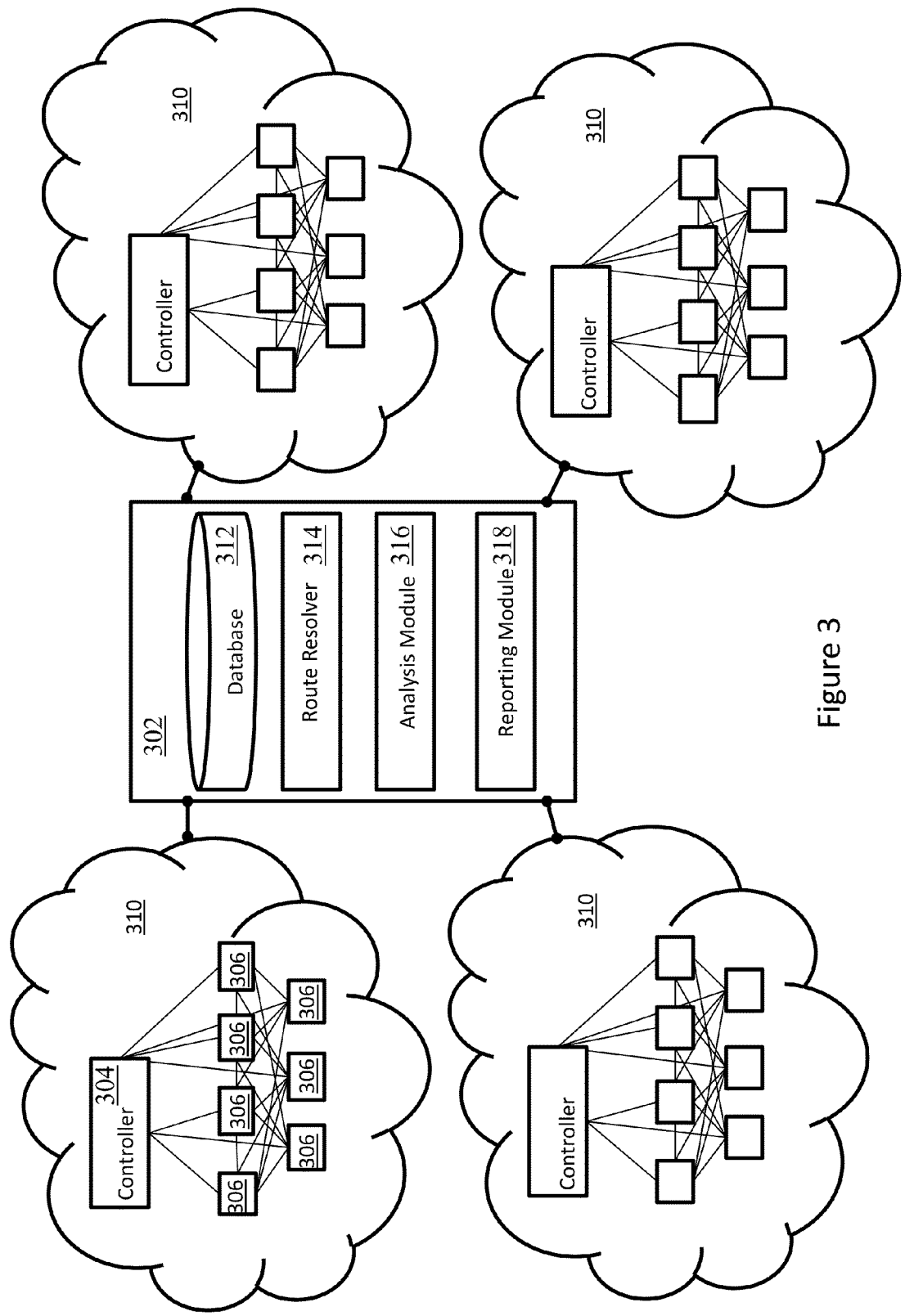
FIG. 3 is a schematic diagram of an example network equipped with a fault detection system, according to an illustrative implementation.

FIG. 3 is a block diagram of a network equipped with a fault detection system. The fault detection system includes a fault detection module 302, a plurality of zone probing controllers 304, and probing agents 306.

Each of the components of the fault detection system (zone probing controllers 304, probing agents 306, and the fault detection module 302) described herein can be implemented as a combination of hardware and software. For example, a component can be implemented as computer readable instructions stored on a tangible computer readable medium. When the computer executable instructions are executed by a processor, the instructions cause the processor to carry out the functionality of the respective components described further below.

In large networks, such as the one depicted in FIG. 3, scalability of fault detection methods is a major issue. To aid in the scalability of the fault detection system in large networks, the network shown in FIG. 3 is divided into zones 310. Each zone includes many thousand, in some cases greater than one million, nodes. Each zone includes nodes physically located in one or more data centers. A network may be divided into zones 300 based on physical location of the nodes, logical grouping of the nodes, or arbitrarily. The number of nodes included in a zone 300 may vary. For example, a zone could include all of the nodes within a superblock, multiple superblocks, or one or more data centers. In some implementations, a network can include only one zone.

Each zone includes a zone probing controller 304. Each zone probing controller 304 is in communication with probing agents 306 in its respective zone and with a fault detection module 302. Zone probing controllers 304 generate probing instructions that include a specified source node and a specified destination node and send each probing instruction to the probing agent 306 associated with the specified source node, for example, as a remote procedure call. Zone probing controllers 304 receive indications from the probing agents 306 of which probing instructions were successful and which failed. The zone probing controllers 304 transmit the information to the fault detection module 302 for further processing. The functionality of the zone probing controller 304 is described further below and in relation to FIG. 4.

Each probing agent 306 is associated with a node in a zone 310. The probing agents 306 can be implemented as standalone computing devices, or they can be implemented as software executing on servers 210 included in the data center, such as the data center 200 shown in FIG. 2. The probing agent 306 can also be incorporated as software executing on a router, switch or other node in the network.

In general, a probing agent 306 receives probing instructions from a zone probing controller 304 and, in response, transmits a probe to the specified destination node. If a response confirming successful receipt by the destination node of the probe is received, the probing agent 306 transmits an indication of such to the zone probing controller 304. If a response is not received by the probing agent 306 from the destination node, the probing agent 306 transmits the probe again. If no response is received from the destination node, the probing agent 306 continues to send the probe until a threshold number of failures has been reached. For example, the threshold number of failed transmissions could be between about five and about ten. When the threshold number of failures has been reached, the probing agent 306 transmits the indication of such to the zone probing controller 304. The probing agent 306 can provide the indication of success or failure of a probing instruction, for example, as a response to the remote procedure call initiating the probe transmission. In some other implementations, the probing agent 306 provides the indication as a separate independent communication. The functionality of the probing agents 306 are described further below and in relation to FIG. 5.

The fault detection module 302 includes a database 312, a route resolver 314, an analysis module 316 and a reporting module 318. Information indicating the success or failure of probing instructions from across the network is received by the fault detection module 302 from the zone probing controllers 304 and is stored in the database 312 included in the fault detection module. Resolved paths associated with the probes can also be stored in the database 312 and may be accompanied by time-stamps or other path data.

As there are multiple paths through the network that may be taken by a probe between any pair of source and destinations nodes, there are a many combinations of different nodes in the network that the probe may have traversed along its failed transmission path. Each of these nodes that may have been traversed by a failed probe are possible faulty nodes causing a silent failure. To narrow the set of nodes that any probe may have traversed, the route resolver 314 of the fault detection module is configured to determine nodes that were likely to have been on the path taken by a probe, from source node to destination node. The route resolver 314 of the fault detection module retrieves probing instructions associated with failed transmissions of probes and, for each retrieved probing instruction, executes a route resolving operation to at least partially resolve the paths traveled by the probes. Paths that are fully resolved and include the destination node are referred to as "successful paths" and partially resolved paths are referred to as "partial paths." The route resolver 314 stores successful and partial paths in the database included in the fault detection module. The route resolver 314 is discussed in greater detail below in reference to FIG. 7.

The analysis module 316 of the fault detection module is configured to determine the most likely set of faulty elements causing a silent failure. The analysis module 316 retrieves successful and partial paths or portions thereof from the database 312. From these paths, the analysis module 316 determines the smallest set of nodes that has the highest likelihood of accounting for the most failed transmissions of probes. This smallest set of nodes that has the highest likelihood of accounting for the most failed transmissions of probes corresponds to the most likely set of faulty nodes causing silent failures.

The reporting module 318 of the fault detection module is configured to retrieve the set of most likely faulty elements causing silent failures and report them. As an example, the reporting module 318 can report the most likely faulty elements causing silent failures by displaying them to a human user. For example, the reporting module 318 can send one or more emails, alert messages, SMS messages or other electronic messages to report the discovered faults. Alternatively the reporting module can directly display the set of nodes on a display device.

In overview, the fault detection system identifies the most likely faults causing silent failures in a network in two phases. The first phase includes obtaining probing information from each zone of the network. The second phase includes aggregating and analyzing the probing information collected from the different zones and identifying the most likely faulty elements causing the one or more silent failures.

Figure 4:
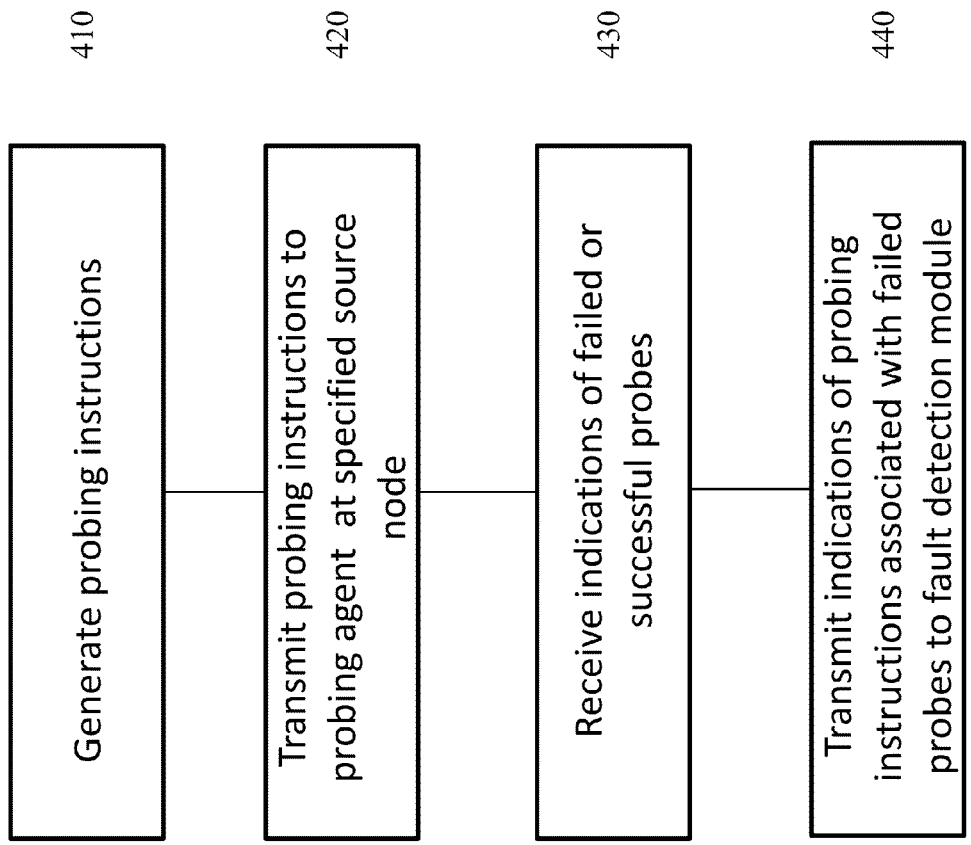
FIG. 4 is a flow diagram of an example method performed by a zone probing controller, according to an illustrative implementation.
Figure 5:
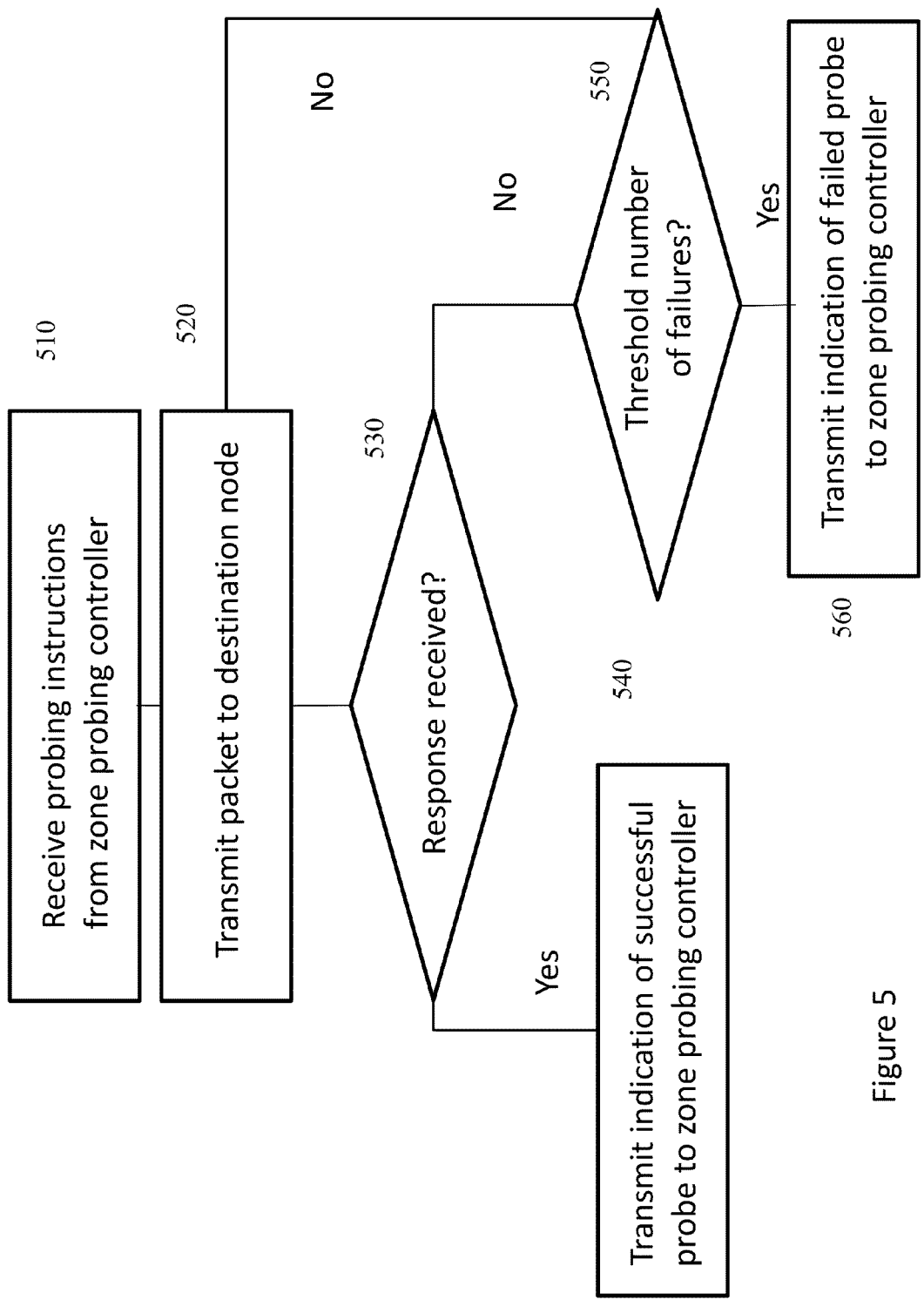
FIG. 5 is a flow diagram of an example method performed by a probing agent, according to an illustrative implementation.

The first phase of fault detection is carried out by the zone probing controllers 304 and probing agents 306, each associated with the respective zones of the network. FIG. 4 shows the method carried out by a zone probing controller 304. FIG. 5 shows the method carried out by a probing agent 306.

As indicated above, FIG. 4 is a flow diagram of steps performed by a zone probing controller 304. Zone probing controllers 304 generate probing instructions (step 410) and send each probing instruction to corresponding probing agents 306 (step 420). Zone probing controllers 304 receive indications from the probing agents 306 of which probing instructions were successful and which failed (step 430) and transmit the information to the fault detection module 302 (step 440).

As indicated above, the zone probing controller 304 is configured to generate probing instructions (step 410). The probing instruction can take the form of a 5-tuple, including [Source IP address, Destination IP Address, Destination Port, protocol, and type of service (ToS)]. The probing instruction includes the 5-tuple because black holes may not be limited to wholesale failures of routers or switches or complete failures of network interfaces. A router or switch may experience a black hole which is limited to the forwarding of data packets of a particular protocol or requiring a particular ToS treatment through a particular port. Data packets associated with other protocols or requiring other ToS treatments may pass through that port without issue. By probing across protocol and ToS, the fault detection module can attempt to not only identify the specific faulty device, but also the nature of that fault. In other implementations, the probing instructions may just include a 3-tuple of [Source IP address, Destination IP address, and Destination Port], a 2-tuple of [Source IP address and Destination IP address] or other size tuple including a combination of similar parameters.

The zone probing controller 304 generates the probing instructions (step 410) according to a defined probing policy. The probing policy specifies rules or guidelines for selection of the values to include in the 5-tuple probing instruction. For example, a probing policy may specify tuple values are to be selected randomly throughout the zone or network. The probing policy may also indicate the frequency with which probing instructions should be generated and the number of instructions to generate. In some implementations, the probing policy may place other constraints on the generation of probes. For example, the probing policy may place limits on the spatial density of source IP addresses or destination IP addresses included in a given cycle of probes to prevent overloading a portion of the zone with an unduly large number of probes. The probing policy can also establish the number of attempts a probing agent 306 should attempt to execute a probing instruction before considering the instruction to have failed. In such implementations, the threshold can be included as one of the parameters in the tuple that forms the instruction. A probing policy may be specific to each zone 310 or may be uniform for the whole network.

For each probing instruction, the zone probing controller 304 transmits the probing instruction to the probing agent 306 associated with the source node specified in the probing instruction (step 420). For example, the zone probing controller 304 can place a remote procedure call to the probing agent 306 including the probing instruction. The frequency of transmission of probing instructions can vary and may depend on the scale of the network and desired coverage. For example in large scale networks, thousands or tens of thousands of probing instructions may be transmitted to probing agents 306 per a minute to achieve a desired probing coverage.

The zone probing controller 304 is further configured to receive indications from the probing agents 306 of which probing instructions were successful and which failed (step 430). In some implementations, the response can be received as a response to the remote procedure call including the instruction. In such cases, the response may be a binary value indicating success or failure. In some implementations, the zone probing controller 304 only receives notice of failed instructions and all instructions for which no failure notification was received after a predetermined about of time are deemed successful. In some implementations, the notification of failure or success includes a copy of the instructions or identifies the probing instructions in any other suitable format. For example, the indication may include a sequence number associated with the instruction instead of a full copy of the instruction. The information can be time-stamped and can be transmitted for each probing instruction.

Upon receiving indications of probing instructions that resulted in failed transmissions or successful transmissions, the zone probing controller 304 transmits the information to a database 312 in the fault detection module 302 (step 440). In some implementations, the zone probing controller 304 transmits the indications of probing instructions that resulted in failed transmissions or successful transmissions directly to the database 312 included in the fault detection module 302. In some implementations, each indication is transmitted by the zone probing controller 304, as it is received, one at a time to minimize the amount of time between receipt of an indication by the zone probing controller 304 and route resolving by the fault detection module 302. In some implementations, the indications are communicated to the fault detection module 302 in bulk according to a fixed schedule or upon receipt of a threshold number of failure notifications. In some implementations, indications are sent with time-stamps or additional information.

FIG. 5 is a flow diagram depicting the functionality of probing agents 306. Each probing agent 306 receives probing instructions from a zone probing controller 304 (step 510) and transmits a probe to the specified destination node (step 520). The probing agent 306 waits for a response to be received from the destination node (decision box 530). If a response is received from the destination node, the probing agent 306 transmits an indication of such to the zone probing controller 304 (step 540). If a response is not received the probing agent 306 again transmits the probe to the destination node (step 520) and repeats the transmission until a threshold number of failures has been reached (decision box 550). When the threshold number of failures has been reached, the probing agent 306 transmits the indication of such to the zone probing controller 304 (step 560).

Each probing agent 306 receives probing instructions from a respective zone probing controller 304 (step 510). The probing instructions received by the probing agent 306 include a tuple specifying a source node and a destination node as well as other probe parameters. As indicated above, each probing agent 306 is associated with a node. The probing agent 306 associated with the source node specified in the probing instruction receives the probing instruction from the zone probing controller 304.

Upon receiving a probing instruction, a probing agent 306 and transmits a probe to the destination node specified in the probing instruction (step 520). The probe is a data packet that prompts a response to be sent from the destination node to the source node upon receipt of the data packet by the destination node indicating success of the transmission. For example, the data packet sent by the probing agent 306 can be a Transmission Control Protocol ("TCP") synchronization request (referred to as a "SYN packet"). A response containing a TCP synchronization acknowledgment (referred to as "SYN-ACK") or receipt of a TCP reset packet (referred to as "RST") would indicate success of the transmission. A lack of response indicates failure of the transmission.

After the probing agent 306 transmits the data packet, it waits for a response for a threshold amount of time (decision box 530). If the probing agent 306 receives a response from the destination node, the transmission is deemed successful and the zone probing controller 304 is informed accordingly (step 540). Once a threshold amount of time has passed from sending the data packet without a response received by the probing agent 306 from the destination node, the probing agent 306 transmits another probe to the same destination (step 520) and again waits for a response. The threshold amount of time can vary. For example the threshold amount of time for the probing agent 306 to wait for a response may be milliseconds, microseconds or seconds.

The probing agent 306 continues to send the probe, then wait for a threshold amount of time, until a threshold number of attempts is reached (decision box 550). The threshold number of attempt can also vary. In some implementations, the threshold number of failed transmissions could be five and the probing agent 306 would attempt transmission of the probe five times, each time waiting for the threshold amount of time. In other implementations, the threshold number can be between 3 and 10. Once a threshold number of attempts is reached without the probing agent 306 receiving a response from the destination node, the transmission is deemed failed and the zone probing controller 304 is informed by the probing agent 306 of the failure (step 560). The indication of success or failure of a probe can be provided by providing copies of the instructions or in any other suitable format. For example, the indication may be in the form of a response to the remote procedure call, where the response is a "1" or a "0," "1" indicating success and "0" indicating failure (or visa versa). The indication of success or failure of the probe may include a time stamp or any additional data.

Figure 6:
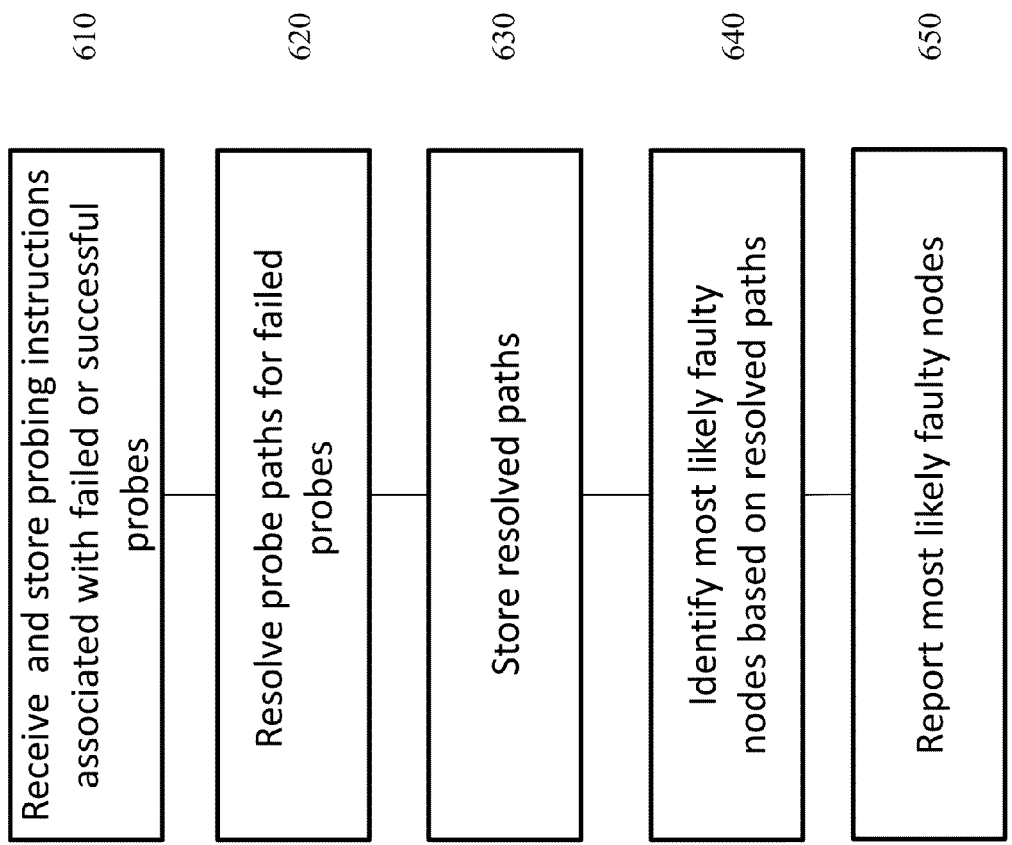
FIG. 6 is a flow diagram of an example method performed by a fault detection module, according to an illustrative implementation.

The second phase of fault detection performed by the fault detection system is carried out by the fault detection module 302. FIG. 6 is a flow diagram depicting the functionality of the fault detection module 302.

The fault detection module 302 receives probing instructions associated with failed and successful probes (step 610), resolves partial probe paths for failed probes (step 620) and stores resolved paths (step 630). Based on the resolved paths, the fault detection module 302 identifies the most likely set of faulty nodes (step 640) and reports the most likely faulty nodes (step 650).

The functionality of the fault detection module 302 begins with the fault detection module 302 receiving and storing indications of failed probing instructions probes from one or more zone probing controllers 304 (step 610). The indications are stored in the database 312 of the fault detection module 302. The database 312 is a computer readable memory capable for storing information. The memory may include, but is not limited to magnetic disk, memory chip random-access memory (RAM), flash memory, or any other suitable computer-readable memory. Probing instructions associated with failed or successful transmission of probes may be stored in the database 312 with associated with time-stamps or other accompanying probing data. Resolved paths are also stored in the database 312 (step 630) and may be accompanied by time-stamps or other path data.

Figure 7:
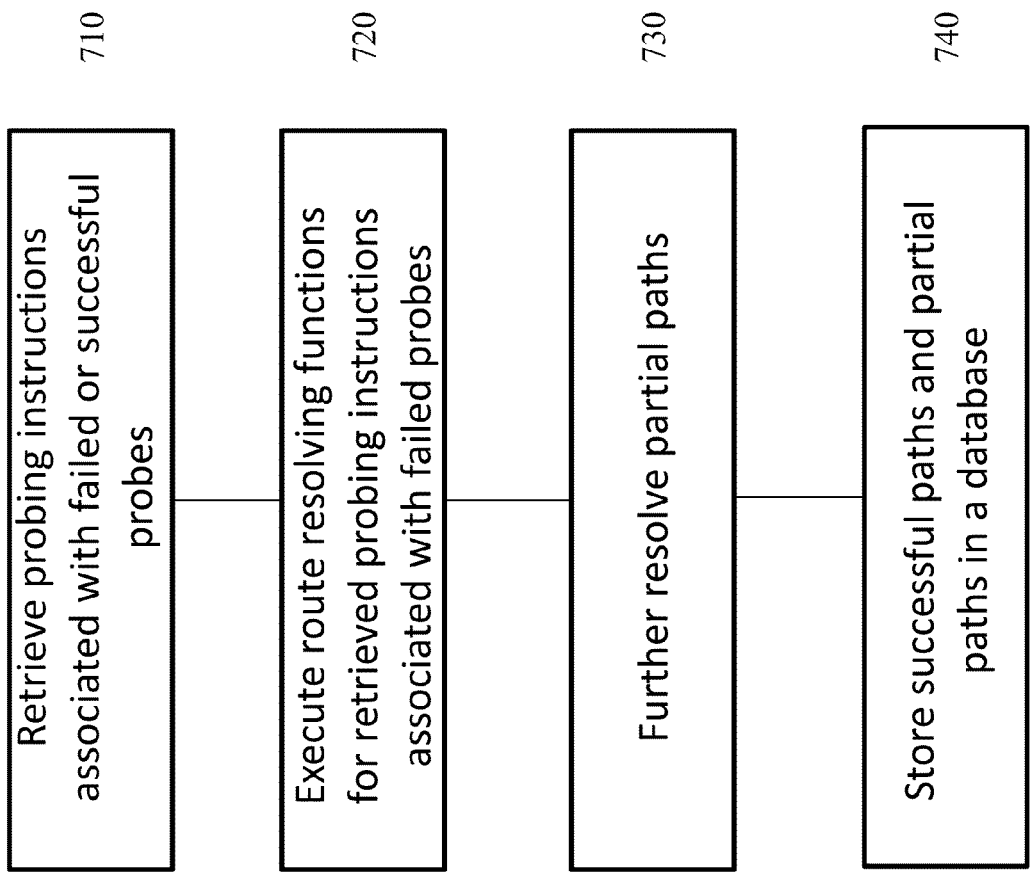
FIG. 7 is a flow diagram of an example method performed by a route resolver, according to an illustrative implementation.

The route resolver 314 of the fault detection module 302 resolves paths for failed probes (step 620). FIG. 7 is a flow chart of steps carried out by the route resolver 314. The route resolver 314 is configured to retrieve probing instructions associated with failed transmissions of probes and, for each retrieved probing instruction, execute a route resolving function.

FIG. 7 is a flow diagram of an example route resolving process 700. The process 700 includes retrieving probing instructions that resulted in failed transmissions from the database 312 by a route resolver 314 (step 710). The route resolver 314 executes route resolving functions to determine a set of nodes that are likely to have been on the path of the from a source node to a destination node specified in the retrieved probing instruction (step 720). This set of nodes is referred to as the partial path. The route resolver 314 further resolves partial paths (step 730) and stores successful and partial paths in the database 312 (step 740).

The route resolver 314 retrieves probing instructions that resulted in failed transmissions from the database 312 (step 710). In many cases, routes in large networks are dynamically determined and may change. For this reason, route resolving functions may be performed soon after a probing instruction that resulted in a failed transmission is reported to the fault detection module 302 by a zone probing controller 304.

Upon receipt by the fault detection module 302 of a probing instruction that resulted in a failed transmission (step 710), the route resolver executes route resolving functions to determine a set of nodes that are likely to have been on the path of the from a source node to a destination node specified in the retrieved probing instruction (step 720). In some implementations, such functions can be executed immediately by the route resolver 314 to maximize the likelihood that the same path is taken by the packets sent during the route resolving as was taken by the probe.

An example of a suitable route resolving functions is a "traceroute" functions that can be performed from the source node to the destination node. The traceroute function includes sending multiple data packets from the source of the failed transmission, each packet having a different time-to-live value. The time-to-live (TTL) value is reduced at each node that it passes through. The data packet prompts a response to be sent back to the source upon either reaching the designated destination of the packet or obtaining a TTL of zero. For example, if a packet with a TTL value of one is sent from a source node to a destination node along a path that includes multiple nodes between the source node and the destination node, the TTL value would be reduced to zero at the first node after the source on the path. In this case, a response would be sent to the source node from the first node after the source node on the path. If a packet with a TTL value of two is sent along the same path, the TTL value would be reduced to zero at the second node after the source on the path, and a response would be sent to the source node from the second node after the source. By sending multiple packets with varying TTL values, the route resolver 314 identifies nodes that were likely to have been on the path of the from the source node to the destination node specified in a given probing instruction. An example of a data packet sent for traceroute functions is an Internet Control Message Protocol (ICMP) echo message.

The traceroute function returns a path including a set of nodes the failed probe likely followed. If the returned path does not include the destination node, it is referred to herein as a "partial path." If it includes the destination node, it is referred to a successful path. Even though paths are generally resolved for failed probe instructions, the route resolver 314 may still identify a successful path from the source node in the probe instruction to the destination node in the probe instruction for several reasons. For example, the fault causing the failed probe instruction may be have been a return path from the destination node to the source node, the network configuration may have changed between the time the probe instruction was attempted and the route resolving function was executed, or the error may have been a result of transient network behavior that resolved in the interim period. The route resolver 314 is configured to time-stamp and store partial and successful paths in the database 312 associated with the fault detection module 302.

The faulty node that resulted in the failure for the probe instruction is likely to either be the last node of the identified path (referred to as the "terminal node" of the path) or the next node the packet was transferred to from the terminal node (referred to as the "terminal node next hop"). Nodes can be fault at their ingress or their egress ports. If the faulty node is faulty at its egress, the node would have received a traceroute query with a TTL value corresponding to its position on the path, and would send a response. However, the egress failure would prevent traceroute queries with higher TTL values from reaching more distant nodes. In these situations, the faulty node would appear as the terminal node of the partial path determined by the route resolver 314. If the failure was at the ingress of the faulty node, that node would not respond to a traceroute query, and thus the terminal node of the partial path identified by the route resolver would be the last properly functioning node in the path. The faulty path would be a not yet identified terminal node next hop.

The route resolver 314 can further resolve the route of a given partial path to identify the potential terminal node next hops that might have been responsible for the failed transmission, in case the failure was not at the terminal node. To do so, the route resolver 314 identifies successful paths already in the database 312 that include the partial path terminal node somewhere in their path (step 730). Alternatively or in addition, the route resolver 314 can cause a predetermined or configurable number of additional traceroutes (or other route resolving functions) to be executed targeting the terminal node of a partial path as a destination, from, for example, randomly selected source nodes. The results of the traceroutes and/or the identified successful paths through the terminal node can yield a set of nodes that are one hop away from the terminal node. In some implementations, a new path can be stored for each potential next hop. For example, if nodes A, B, and C are potential terminal node next hops for a partial path, separate partial paths can be stored including the original partial path with the addition of nodes A, B, and C, respectively. Alternatively, the identification of nodes A, B, and C as potential terminal node next hops can be stored as part of the data associated with the initial partial path.

In some cases, for example, when the path from the destination to the source is different from the path from the source to the destination, the fault causing a probe instruction to fail can be located at a node on the return path from destination to source but not on the path from the source to the destination. As such, in some implementations, the route resolving function includes a "reverse traceroute" in addition to the traceroute function described above. With a reverse traceroute, the route resolver causes the destination node to execute a traceroute function back to the source. In some implementations, this reverse path can be considered and treated like any other potentially faulty path. If either the forward traceroute or the reverse traceroute yield successful paths to their destination (the probe instruction destination node in the former and the probe instruction source node in the latter), the route resolver can identify the successful path as such, removing it from the set of faulty paths. In other implementations, the paths resolved by reverse traceroute functions and traceroute functions can be combined and the nodes identified by either function can be stored in the same path. In some implementations, a partial path can include only the terminal node and/or terminal node next hopes identified by the traceroute and reverse traceroute functions.

Referring back to FIG. 2, if the route resolving function described above is employed from source node, server 210*a*, to destination node, server 210*h*, following the path from server 210*a*, through ToR switch 212*a*, aggregating switch 216*a*, top-tier aggregating switch 217, aggregating switch 216*b*, ToR switch 212*b* and then to server 210*h*, and top-tier aggregating switch 217 was the faulty node (at its ingress) causing a silent failure, responses from ToR switch 212*a* and aggregating switch 216*a* would be received by server 210*a*. If the route resolving function described above is employed from destination node, server 210*h* to source node, server 210*a*, for the same path, responses would be received from ToR switch 212*b* and aggregating switch 216*b*. It is also possible that a response would be received from the top-tier aggregating switch 217, depending on the exact type of fault in that node. For purposes of this example, top-tier aggregating switch 217 is the last node in the partial path from the source node to the destination node. The route resolver 314 can retrieve successful paths from a database 312 included in the fault detection module 302 that include aggregating switch 216*a* as a node in the path. From these successful paths, the route resolver 314 can identify nodes that are one hop away from top-tier aggregating switch 217, the last node of the partial path, and include them as potential next hops in the partial path for a probing instruction with source node, server 210*a* and destination node, server 210*h*. In the current example, potential next hops from top-tier aggregating switch 217 may be determined by the route resolver 314 to be spineblock 218 or aggregating switch 216*b*. The partial path, time-stamped and stored in the database 312, could include top-tier aggregating switch 217, as the last node and, as potential next hops, spineblock 218 and aggregating switch 216*b*. In other implementations, a separate route may be stored for each next hop. In this case, a partial path including top-tier aggregating switch 217, as the last node, and spineblock 218 could be stored as well as a partial path including top-tier aggregating switch 217, as the last node, and aggregating switch 216*b*.

Figure 8:
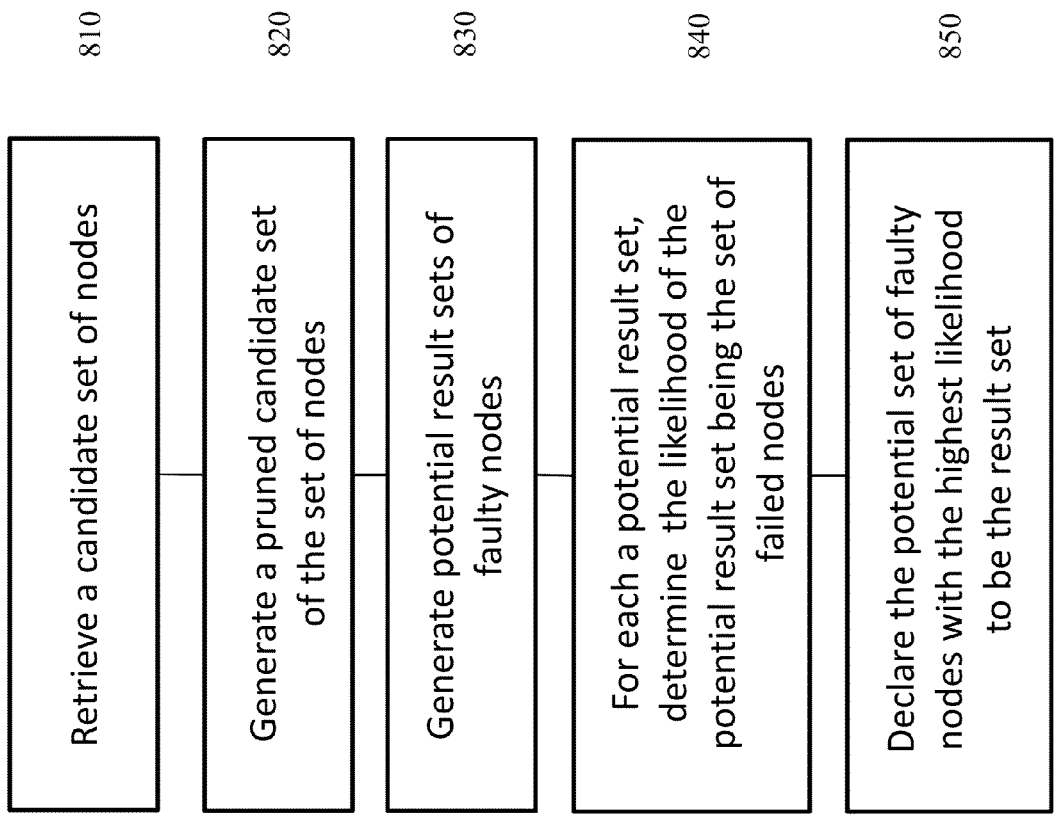
FIG. 8 is a flow diagram of an example method performed by an analysis module, according to an illustrative implementation.

The analysis module 316 determines the most likely set of faulty nodes causing a silent failure (referred to as the "result set") based on paths resolved by the route resolver (step 640). FIG. 8 is a flow chart depicting the functionality of an analysis module 316. The analysis module 316 uses information collected by the other components of the fault detection system to calculate the result set. The analysis module 316 retrieves a candidate set of nodes, including nodes that are on paths traveled by probes (step 810). The analysis module 316 can generate a pruned candidate set that is a subset of nodes that are potentially faulty (step 820). The analysis module 316 selects potential result sets of nodes that are each a potential faulty node (step 830). The analysis module 316 then determines the likelihood of each potential result set being the set of failed nodes (step 840). The result set is the most likely set of failed nodes resulting in silent failure. The analysis module 316 declares the potential result set with the highest likelihood to be the result set (step 850).

The analysis module 316 retrieves a candidate set of nodes from the database 312 of the fault detection module 302 (step 810). The candidate set includes nodes that are included in paths traveled by probes. The candidate set of nodes is also referred to as set S. Set S can contain some or all of the nodes that were traversed by probes in a given zone, group of zones, datacenter or entire network. The nodes are associated with paths traveled by probes and indications of whether the path was successful or failed. The set S can include nodes included in faulty paths ($p_1, p_2, p_3 \ldots p_m$) or nodes included in both faulty paths ($p_1, p_2, p_3 \ldots p_m$) and successful paths ($o_1, o_2, o_3 \ldots o_m$). The set S can include tens of nodes or it can include hundreds, thousands, tens of thousands or more nodes depending on the number of probes, the size of the network, the frequency of probes sent through the network or other factors.

The analysis module 316 can generate pruned candidate sets of nodes (step 820). A pruned candidate set of nodes is a subset of the set S, referred to as S'. The pruned candidate set includes the nodes in the candidate set of nodes most likely to be faulty, and is selected to reduce the processing burden associated with the evaluation process. Nodes can be selected to be part of the pruned candidate set based on a variety of factors. Some of these factors include but are not limited to the number of partial paths a node is included in, the length of paths that the node was included in, and the position in a path that the node was included in. As an example, the subset S' can be limited to nodes in S that were the terminal nodes partial paths. The pruned candidate set S', can include tens of nodes or it can include hundreds, thousands or more nodes.

The analysis module 316 selects potential result sets of nodes (step 830). Each potential result set is a potential set of failed nodes resulting in silent failure. The potential result sets include one or more nodes that are included in failed paths. The potential result sets are subsets of S' or S and are referred to as subsets A. In some implementations, each potential result set can include less than ten nodes. In some implementations, each potential result set A can include less than five nodes. The maximum number of nodes can be configured according to the reliability expectations for the networked, determined empirically. More robust networks can use smaller maximum result set sizes, where more fault-prone networks may use larger maximum result set sizes. In some implementations, the number of nodes available for inclusion in a potential result set is limited. For example, the nodes in the pruned candidate set S' can be ranked based on the number of partial paths (i.e., failed paths) the node was included in. The analysis module 316 may then limit the set of nodes from the pruned candidate list S' that can selected for potential result sets A to a predetermined or configurable number (e.g., between about 10 and about 50) of the highest ranking (i.e, included in the most failed paths) nodes in the pruned candidate list. In some other implementations, only the nodes that fall in the highest rank quartile, decile, or other tranche of nodes in the pruned candidate set S' are made available for inclusion in potential result sets A.

The analysis module 316 can generate the potential result sets A by identifying all potential permutations of the nodes available for inclusion in potential results sets of increasing size from 1 up to the maximum set size. For example, the analysis module will create potential result sets A including each individual node available for inclusion, all possible pairs of nodes, all combinations of three nodes, and so forth up to the maximum potential result set size.

For each potential result set, the analysis module 316 calculates the likelihood that the potential result set is the set of failed nodes causing silent failure (step 840). To do so, the analysis module 316 calculates a likelihood estimator (LE) for each potential result set A. The potential result set with the greatest likelihood estimator is the most likely set of failed nodes causing silent failures (the result set). One example likelihood estimator is described in further detail below. In other implementations, the analysis module 316 can use other likelihood estimators or other methods of maximum likelihood estimation to identify the result set.

For the likelihood estimator described below, it is assumed that a faulty node has a probability r of losing a packet that passes through it and a working node has a much lower probability s of losing a packet that passes through it. In some implementations, r can be assumed to be 100%, where all data packets passing through a faulty node are lost. In other implementations, r can be assigned a value less than 100%. For example, r can be between about 80% and about 99.99%, and typically is selected to above 95% or even over 99%. In general, s is much smaller than r. For example, s can be 1% or 0.1%. Typical values suitable for s range from about 0% up to about 10%, and are usually less than 5% or less than 1%. The values for r and s are defined for the analysis module 316 and can be configured by a user or system administrator. The values can be based on observed data or can be assumed. Values for r and s can be input into the analysis module 316 by a user for each set of nodes analyzed or can be the same for all sets analyzed. In some implementations, the values of r and s could vary from node to node. For example, a network may include devices of varying reliability. Devices with higher reliability would have higher values of r and lower values of s than lower reliability devices, which may have a higher likelihood of sporadically mishandling packets.

As used herein, a subset A of set S' or S is the potential set of faulty nodes and e is a node in a set. The likelihood estimator for A, LE(A) can be understood as the probability of A being the set of faulty nodes multiplied by the probability of the set of faulty nodes being included in paths $p_i$ and the probability of the set of faulty nodes being included in the paths $o_i$.

The Likelihood Estimator for A can be written $$LE(A) = P(A) \times \prod_{p_i} P(p_i) \times \prod_{o_i} P(o_i)$$

P(A) represents a probability factor associated with A being set of faulty nodes causing silent failure. P(A) acts as a coefficient that is dependent on the number of elements in the subset and, thus, favors smaller subsets A. In some implementations $2^{-|A|}$ is used for P(A), where |A| is the number of nodes in the subset A. In some implementations, though, P(A) is kept constant for all size sets A, and set size is merely used as a "tie-breaker" when the likelihood estimates for two or more sets A are equal, nearly identical, or within a configurable threshold difference from one another.

One way of calculating $P(p_i)$ (i.e., the probability that the set of faulty nodes are included in the paths $p_i$) is given by the below equation. For each path, $p_i$, the analysis module calculates $1-s_e$ for all elements e that are in the paths $p_i$ and not in the subset A. The product of these values is multiplied by the product of $1-r_e$ for all elements e that are in paths $p_i$ and included in subset A. This gives a value v. The product of $1-v$ for all paths $p_i$ gives the value for $P(p_i)$.

$$P(p_i) = \prod_{p_i} \left(1 - \prod_{e \in pi \text{ and } e \in A} (1 - r_e) \prod_{e \in pi \text{ and } e \notin A} (1 - s_e)\right)$$

The probability for $P(o_i)$ (i.e., the probability that the set of faulty nodes are included in the paths $o_i$) is given by the below equation, where $1-s_e$ is calculated for all elements e that are in the paths $o_i$ and not in the subset A. The product of these values is multiplied by the product of $1-r_e$ for all elements e that are in paths $o_i$ and included in subset A. This gives a value w. The product of w for all paths $o_i$ gives the value for $P(o_i)$ $$P(o_i) = \prod_{o_i} \left(\prod_{e \in pi \text{ and } e \in A} (1 - r_e) \prod_{e \in pi \text{ and } e \notin A} (1 - s_e)\right)$$

In some implementations, the analysis module 316 computes $P(o_i)$ using the number of probes that traverse each node, the value for $s_e$ and the number of successful probes that pass through each node, referred to as $g_e$. The solution for $P(o_i)$ can, therefore, be written $$P(o_i) = \prod_{e \in A} (1 - r_e)^{g_e} \prod_{e \notin A} (1 - s_e)^{g_e}$$

In other implementations, the value for $P(o_i)$ can be assumed to be equal to 1 for the purposes of calculating the LE(A). In this case, LE(A) is calculated without taking $P(o_i)$ into account.

In some implementations, where P(A) is the same for all subsets A and where $P(o_i)$ is assumed to be equal to 1, LE(A) can be compared for subsets A based solely on their respective $P(p_i)$ values. $P(p_i)$ is calculated for each subset A and the subset A with the greatest $P(p_i)$ is also the subset A with the greatest LE(A). In such implementations, the number of elements in a subset A can be used to select the result set between subsets A that have LE(A) values within a defined range of each other. This range can be configured by a user. For example, if two subsets A and A' have LE(A) values that are within a defined range of each other, subset A includes 3 nodes, and subset A' contains 4 nodes, subset A will be declared the result set by the analysis module 316.

The analysis module 316 declares the subset A with the greatest LE(A) to be the result set (step 850). The result set is the most likely set of failed nodes causing silent failures. This result set can be stored in the database 312, or sent directly to the reporting module 318.

The reporting module 318 is configured to display or otherwise communicate to a human user (or operator) the resulting set of most likely failed network nodes (step 650). The reporting module 318 can also be configured to present data stored in the database 312 included in the fault detection module 302. For example, the reporting module 318 can display failed or successful probes and probing instructions or paths associated with probes. The reporting module 318 can include a user interface which allows the human user interactions with the fault detection system. The user interface can be a graphical user interface, a web-based user interface, a command line user interface, or other types of user interfaces. Alternatively or in addition, the reporting module 318 can be configured to send one or more emails, alert messages, SMS messages or other electronic messages to report the discovered faults. The user interface can allow users (e.g., network administrators) to monitor the frequency of probing, accept user inputs to modify parameters of the fault detection system, display alerts indicating detected faults, and/or display other monitoring results. The reporting module 318 can include one or more display units that allow information to be viewed or otherwise perceived in connection with execution of the instructions and reported results.

The implementations of a fault detection system described herein are discussed in terms of nodes, where each node could be a switch, router, other forwarding device within a network or one of a plurality of ports located thereon. In some implementations, the fault detection system disclosed herein can be employed to analyze individual network interfaces located on devices in a network or individual internal modules inside the device. In such implementations, instead of nodes, specific interfaces or specific internal modules associated with nodes may be considered by the fault detection system.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on one or more computer storage medium for execution by, or to control the operation of, data processing apparatus. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). Accordingly, the computer storage medium may be tangible and non-transitory.

The operations described in this specification can be implemented as operations performed by a data processing apparatus on data stored on one or more computer-readable storage devices or received from other sources.

The terms "computer" or "processor" include all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array)

or an ASIC (application specific integrated circuit). The apparatus can also include, in addition to hardware, code that creates an execution environment for the computer program in question, e.g., code that constitutes processor firmware, a protocol stack, a database 312 management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

What is claimed is:

1. A system for fault detection comprising:
a plurality of probing controllers associated with a network having a plurality of nodes, wherein each probing controller is configured to:
   generate a plurality of probing instructions, each probing instruction including a respective source node address and a respective destination node address, the respective source node address identifying a respective source node in the network;
   forward each of the plurality of probing instructions to the respective source nodes identified in the respective probing instructions;
   receive, responsive to forwarding a first probing instruction to a first source node, data from the first source node indicative of a failure in transmitting a data packet to a destination node identified in the first probing instruction; and
   inform, in response to receiving the data indicating the failure of the source node to transmit the data packet to the destination node identified in the first probing instruction, a fault detection module of the probing instruction associated with the failed transmission; and
the fault detection module, wherein the fault detection module is configured to:
   receive, from a probing controller, identification of a plurality of probing instructions each associated with a corresponding failed transmission;
   for each of the probing instructions received by the fault detection module, identify a plurality of nodes having a likelihood of being in a network path associated with the failed transmission corresponding to the respective probing instruction; and
   identify a set of likely failed nodes by processing the identified plurality of nodes having a likelihood of being in a network path associated with at least one of the failed transmissions.

2. The system of claim 1, wherein:
the network includes a plurality of zones, each zone including one or more nodes of the plurality of nodes in the network; and
each respective probing controller of the plurality probing controllers is respectively associated with at least one zone and configured to include, in probing instructions generated by the respective probing controller, source node addresses corresponding to nodes within the respectively associated zone.

3. The system of claim 1, further comprising a reporting module configured to report the set of likely failed nodes identified by the fault detection module.

4. The system of claim 1, wherein identifying the plurality of nodes having a likelihood of being in a network path associated with the failed transmission corresponding to the respective probing instruction includes:
identifying nodes on a network path from the source node specified in the probing instruction to the destination node specified in the probing instruction.

5. The system of claim 1, wherein identifying the plurality of nodes having a likelihood of being in a network path associated with the failed transmission corresponding to the respective probing instruction includes:
identifying nodes on a network path from the destination node specified in the probing instruction to the source node specified in the probing instruction.

6. The system of claim 1, further comprising:
a probing agent configured to:
   receive a second probing instruction from a first probing controller in the plurality of probing controllers, the second probing instruction including a probe destination address;
   transmit a probe packet to the probe destination address specified in the second probing instruction; and
   inform the first probing controller of an outcome of transmitting the probe packet.

7. The system of claim 1, wherein processing the identified plurality of nodes having a likelihood of being in a network path associated with the failed transmission to identify a set of likely failed nodes further comprises identifying a minimum set of failed nodes with a maximum likelihood of accounting for a maximum set of failed transmissions, as compared to one or more other sets of nodes.

8. The system of claim 1, wherein generating the plurality of probing instructions further comprises selecting the respective source nodes identified in the probing instructions randomly.

9. The system of claim 1, wherein each probing controller is further configured to inform the fault detection module of probing instructions associated with successful transmissions.

10. A method for fault detection comprising:
generating a plurality of probing instructions by a probing controller in a network having a plurality of nodes, each of the probing instructions including specification of a respective source node address and a respective destination node address, the respective source node address identifying a respective source node;
for each probing instruction in the plurality of probing instructions:
   transmitting the probing instruction to a probing agent coupled to the respective source node identified in the probing instruction, and
   transmitting a data packet from the probing agent to the respective specified destination node address;

informing a fault detection module of a probing instruction associated with a failed transmission, wherein the failed transmission is indicated by failure of a particular source node to transmit a probing data packet to a destination node identified in the probing instruction associated with the failed transmission;

identifying a plurality of nodes having a likelihood of being in a network path associated with the failed transmission; and identifying a set of likely failed nodes by processing the plurality of nodes having a likelihood of being in the network paths associated with failed transmissions.

11. The method of claim 10, wherein:

the network includes a plurality of zones, each zone including one or more nodes of the plurality of nodes in the network;

the probing controller is associated with a zone in the network; and for each of the probing instructions generated by the probing controller, the respective source node address corresponds to a node within the zone.

12. The method of claim 10, further comprising reporting the identified set of likely failed nodes.

13. The method of claim 10, wherein identifying the plurality of nodes having a likelihood of being in a network path associated with failed transmissions further comprises:

for each probing instruction associated with a failed transmission:

identifying nodes on a network path from the source node specified in the probing instruction to the destination node specified in the probing instruction.

14. The method of claim 10, wherein identifying the plurality of nodes having a likelihood of being in a network path associated with failed transmissions further comprises:

for each probing instruction associated with a failed transmission:

identifying nodes on a network path from the destination node specified in the probing instruction to the source node specified in the probing instruction.

15. The method of claim 10, wherein processing the identified plurality of nodes having a likelihood of being in a network path associated with the failed transmission to identify a set of likely failed nodes further comprises identifying a minimum set of failed nodes with a maximum likelihood of accounting for a maximum set of failed transmissions, as compared to one or more other sets of nodes.

16. The method of claim 10, wherein generating the plurality of probing instructions further comprises selecting the respective source nodes identified in the probing instructions randomly.

17. Non-transitory computer-readable media storing processor executable instructions that, when carried out by one or more processors, cause the processors to:

generate a plurality of probing instructions by a probing controller associated with a network having a plurality of nodes, each of the probing instructions including specification of a respective source node address and a respective destination node address, the respective source node address identifying a respective source node;

for each probing instruction in the plurality of probing instructions:

transmit the probing instruction to a probing agent coupled to the respective source node identified in the probing instruction, and transmit a data packet from the probing agent to the respective specified destination node address;

inform a fault detection module of a probing instruction associated with a failed transmission, wherein the failed transmission is indicated by failure of a particular source node to transmit a probing data packet to a destination node identified in the probing instruction associated with the failed transmission;

identify portions of network paths associated with the failed transmission; and process the identified portions of network paths associated with failed transmissions to identify of a set of likely failed nodes.

18. The computer readable media of claim 17, wherein:

the network includes a plurality of zones, each zone including one or more nodes of the plurality of nodes in the network;

the probing controller is associated with a zone in the network; and for each of the probing instructions generated by the probing controller, the respective source node address corresponds to a node within the zone.

19. The computer readable media of claim 17, wherein identifying a plurality of nodes having a likelihood of being in a network path associated with failed transmissions further comprises:

for each probing instruction associated with a failed transmission:

identifying nodes on a network path from the source node specified in the probing instruction to the destination node specified in the probing instruction.

20. The computer readable media of claim 17, wherein identifying a plurality of nodes having a likelihood of being in a network path associated with failed transmissions further comprises:

for each probing instruction associated with a failed transmission:

identifying nodes on a network path from the destination node specified in the probing instruction to the source node specified in the probing instruction.

21. The computer readable media of claim 17, wherein processing the identified plurality of nodes to identify a set of likely failed nodes further comprises identifying a set of failed nodes with a maximum likelihood of accounting for a maximum set of failed transmissions, as compared to one or more other sets of nodes.

22. The computer readable media of claim 17, wherein generating the plurality of probing instructions further comprises selecting the respective source nodes identified in the probing instructions randomly.

23. The computer readable media of claim 17, further storing instructions for reporting the identified set of likely failed nodes.

* * * * *